3,168,008
BALANCED RELAY VALVE FOR SAFETY
CONTROL SYSTEM
Robert I. Bingel, Arlington Heights, Ill., assignor to Mead Specialties Company, Inc., Chicago, Ill., a corporation
Filed Oct. 19, 1962, Ser. No. 232,671
4 Claims. (Cl. 91—178)

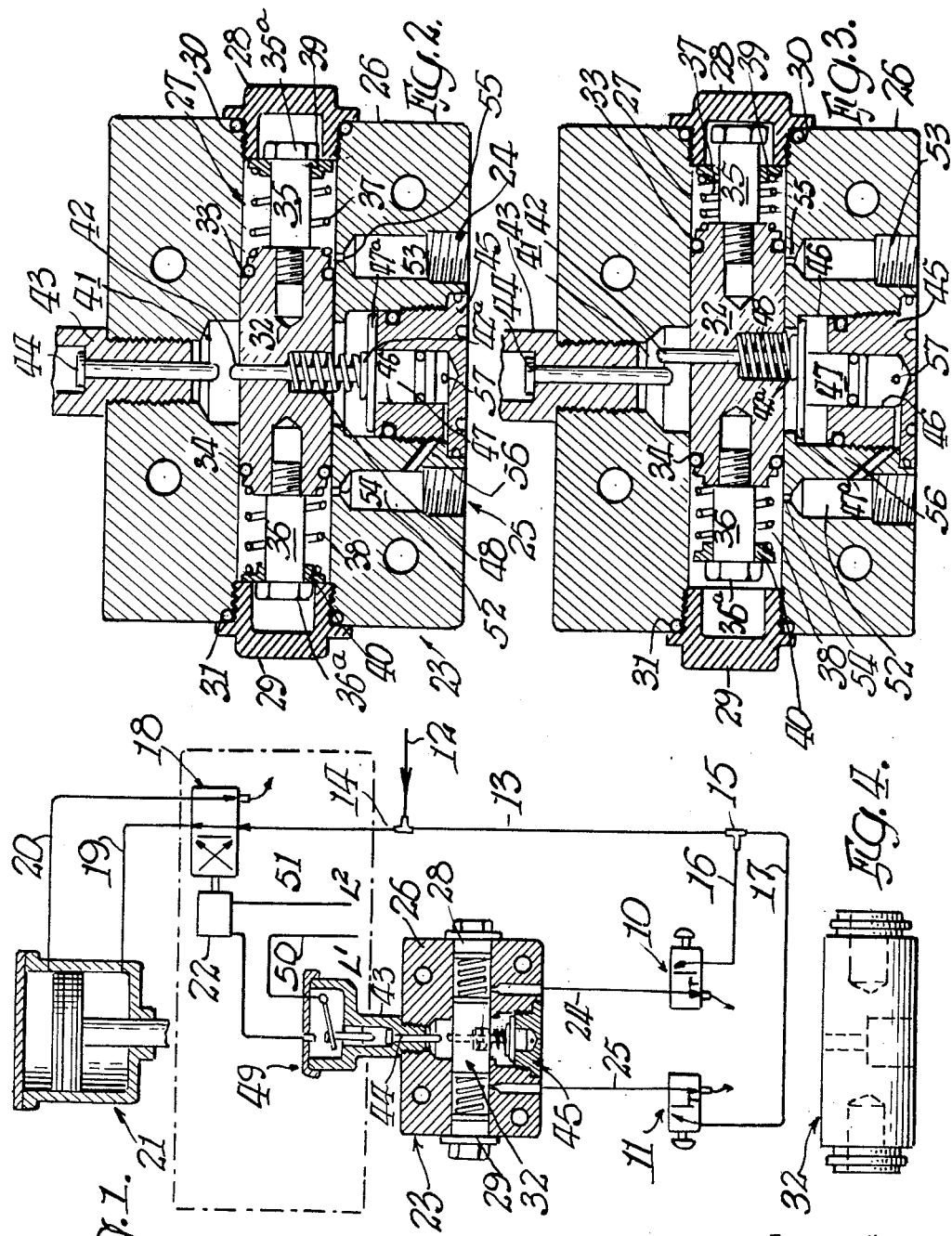

This invention relates to a safety control and, more particularly, to a control arrangement for a workpiece wherein two valves must be simultaneously operated by the operator in order to initiate workpiece action.

The instant invention has particular application to reciprocating machines like presses, and the like, wherein on occasion the operator has injured his hand by being able to operate the machine with only one hand. In certain of the devices advanced for overcoming this problem in the past, two valves have been provided, but it has been possible for the machine operator to "tie down" one of the valves so as to circumvent the protective purpose.

In other expedients, there has been required complex valving and complicated equipment in general necessary to avoid the above-mentioned circumvention which has made installation and maintenance difficult—to the extent that many factory managers cannot economically employ such safety systems.

It is therefore a general object of this invention to provide a safety control which overcomes the previously mentioned drawbacks, i.e., a simplified control system making use of relatively rugged, simple parts, yet which is "foolproof."

Another object of the invention is to provide a safety control system employing a pair of valves to be operated by a machine operator, or the like, and a relay which can only be actuated to start up a machine if both valves are actuated simultaneously, the relay, because of its simplicity and ruggedness, being relatively sensitive so as to facilitate rapid machine response and thereby achieve uniform and high production.

Still another object of the invention is to provide a novel relay or responsive element for a safety control system wherein a machine operator is required to simultaneously deliver two signals in order to operate a machine.

Other objects and advantages of the invention, both general and specific, may be seen in the detals of construction and operation set down in the following specification.

The invention will be explained in conjunction with an illustrative embodiment in the accompanying drawing, in which—

FIG. 1 is an elevational view, partially in section and partially schematic, of a control system employing the teachings of this invention;

FIGS. 2 and 3 are enlarged fragmentary sectional views of the relay portion of FIG. 1, but in different operative conditions; and FIG. 4 is a reduced size plan view of the relay of FIGS. 2 and 3.

In the illustration given, and with particular reference to FIG. 1, the numerals 10 and 11 designate generally a pair of three-way valves each of the normally closed variety. The numeral 12 designates a conduit leading from a source of compressed air (not shown), or other pressure fluid, which is in communication with a conduit 13 and a conduit 14. The conduit 13 is equipped with a restrictor orifice 15 and branch lines 16 and 17 leading, respectively, to the valves 10 and 11.

The line 14 leads to a four-way valve 18 which, through conduits 19 and 20, communicates with the ends of a cylinder and piston rod unit, generally designated 21, and which constitutes a workpiece to be operated by the control system described herein. The four-way valve 18 is positionable by means of a solenoid 22 so as to deliver air selectively to either end of the cylinder and piston rod unit 21.

For positioning the solenoid, a relay generally designated 23 is employed, and it will be seen that the three-way valves 10 and 11 are connected to the relay by means of conduits 24 and 25, respectively.

*Relay construction*

Referring now to FIGS. 2 and 3, the relay 23 is seen to include a body 26 having an elongated bore 27. Advantageously, the body 26 may be made of a single piece casting and the ends of the bore 27 are closed by threaded end caps as at 28 and 29. Suitable seals, as at 30 and 31, insure the prevention of leakage of compressed air out of the ends of the passage 27.

Mounted for sliding movement in the elongated passage 27 is a spool generally designated 32 and which is seen to be equipped with O-ring seals 33 and 34 adjacent the ends thereof. Each end of the spool carries a threaded post as at 35 and 36 terminating with a bolt head as at 35a and 36a for the tpurpose of limiting the travel of the spool 32 in the bore 27.

The spool 32 is biased to a predetermined position intermediate the ends of the bore 27, i.e., center, by virtue of coiled springs 37 and 38. Each spring 38 abuts an end of the spool 32 and an end collar as at 39 and 40, respectively.

The body 26 is equipped with a second bore 41 which extends transversely to the bore 27 and is essentially cylindrical, whereby the center of the spool 32 is axially aligned with the bore 41 when the spool is in the predetermined center position shown.

Mounted in the center of the spool 32 and on the axis of the second bore 41 is a plunger 42. Mounted in the second bore 41 adjacent one end thereof is a bored closure element 43 which slidably carries a pilot element 44. The pilot element 44 is on the axis of the second bore 41.

Adjacent the other end of the bore 41 is a second closure element 45, apertured as at 46 to provide a cylinder in which a piston 47 is slidably mounted. The piston 47, at its upper end as at 47a, is equipped with an enlarged head bearing against the enlarged head 42a of the plunger 42. The plunger 42 is equipped with a coiled spring as at 48 for the purpose of urging the heads 42a and 47a into engagement.

The operation briefly contemplates that is the piston 47 is raised (in the configuration shown in FIG. 2), its movement compresses the spring 48 and its upward movement urges the plunger 42 upwardly against the bias of the spring 48 so as to move the pilot element 44 upwardly. This in turn actuates an electrical switch 49 (see FIG. 1) for delivering power to the solenoid 22 through the lines 50 and 51 (L1 and L2).

Air is supplied to the body 26 through inlet ports 52 and 53 communicating respectively with conduits 25 and 24. The ports 52 and 53 are equipped with constrictions as at 54 and 55 communicating with the ends of the bore 27. Additionally, the port 52 is equipped with a branch passage 56 terminating in a constriction 57 which communicates with the aperture or cylinder 46 in the end closure 45.

It can be seen if air pressure is supplied to merely one of the inlet ports 52 or 53, the spool 32 will be moved from its vertical center line and will no longer coincide with the center line of the pilot element 44 (see FIG. 3 where air has only been supplied port 52 as from valve 11). However, if air pressure is supplied simultaneously to each inlet 52 and 53, there will result a forced balanced condition on the spool 32 and no horizontal movement will result (as shown in FIG. 2), at the same time, air is fed through the angular branch air passage 56 to the bottom of the piston 47, resulting in vertical travel of the plunger 42 and the desired contact with the pilot element 44.

If air pressure is released from either inlet 52 or 53, spool 32 will shift toward the direction of the port in which the air is so released and upset the vertical center line relationship between the pilot element 44 and plunger 42, thus breaking contact.

From the above, it can be seen that if an operator is required to feed both inlet ports of the relay 23 through two normally-closed three-way valves, both of his hands will be occupied for this action, keeping him "safe." If one valve, i.e., hand, is released, the relay 23 breaks contact and returns the pilot element 44 to safe condition. Also, if one valve is tied down, the spool 32 will shift off-center and not allow the pilot element 44 to operate, again keeping the system "safe."

Through the use of the constrictions 54 and 55, it is possible to achieve an advantageous sealing through the use of the O-rings 33 and 34—as would occur when the operator attempts to tie down one hand valve. In this situation, one of the O-rings 33 or 34 will pass its associated constriction 53 or 54 and make it impossible to feed air to that end of the spool 32, thus assuring that the centering action of the springs 37 and 38 will not override friction of the spool assembly and subsequently cause the spool to center and create an "unsafe" condition.

While in the foregoing specification a detailed description of an embodiment of the invention has been set down for the purposes of explanation thereof, many variations in the details herein given will be perceived by those skilled in the art without departing from the spirit and scope of the invention.

I claim:

1. In a control system for a workpiece wherein two valves must be simultaneously operated to initiate workpiece action, a pair of three-way valves each connected to a source of pressure fluid, exhaust and a control relay, said relay including a body having a bore, a spool element slidably mounted in said bore, means in said bore biasing said spool to a centered position in said bore, a plunger mounted in said spool for transverse movement relative to the spool movement, means communicating one of said valves with said relay for moving said plunger, and means in said relay actuatable by said plunger only when said spool is in centered position.

2. The structure of claim 1 in which said body is equipped with a pair of passages communicating said valves with opposite ends of said bore, a piston in contact with said plunger, and a passage communicating one of said passages with said piston.

3. In a control relay for a control system for a workpiece wherein two valves must be simultaneously operated to initiate workpiece action, a pair of three-way valves each connected to a source of pressure fluid, exhaust and a control relay, said relay comprising:
   a body having an elongated bore,
   a spool mounted for sliding movement in said bore,
   a spring at each end of said bore urging said spool to a predetermined position intermediate the ends of said bore,
   a second elongated bore in said body arranged perpendicularly to the first-mentioned bore,
   a pilot element mounted for sliding movement in said second bore,
   a plunger carried by said spool for movement longitudinally of said second bore and in alignment with said pilot element for moving the same when said spool is in said predetermined position,
   a piston in said second bore for moving said plunger toward said pilot element upon operation of one of said valves, and
   a pair of pressure fluid passages communicating said valves respectively with opposite ends of said first-mentioned bore, one of said passages also being equipped with a branch passage for delivering pressure fluid to said second bore for moving said piston, whereby simultaneous operation of said valves moves only said piston to move said plunger for actuating said pilot element without affecting the bias of said spool.

4. The structure of claim 3 in which each of said passages is equipped with a constriction limiting the flow of pressure fluid into the ends of said first-mentioned bore, said spool being equipped with a seal at each end thereof movable into covering relation with one of said constrictions.

References Cited in the file of this patent
UNITED STATES PATENTS
2,013,102    Ledbetter _____ Sept. 3, 1935